United States Patent Office 3,437,674
Patented Apr. 8, 1969

---

3,437,674
OXIME ESTERS OF 19-NORANDROSTENES
Arvin P. Shroff, Piscataway, N.J., assignor to Ortho Pharmaceutical Corporation, a corporation of New Jersey
No Drawing. Filed July 6, 1966, Ser. No. 563,081
Int. Cl. C07c *169/12*
U.S. Cl. 260—397.1                                    7 Claims

ABSTRACT OF THE DISCLOSURE 3-oxime esters of 19-norandrostenes which are potent oral antilittering agents.

---

This invention relates to novel steroids. More particularly, the invention relates to 3-oxime esters of 19-norandrostenes.

The compounds of the invention have the general formulae:

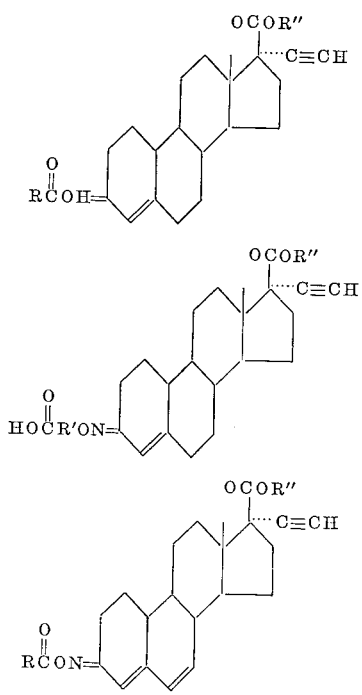

wherein R is alkyl of from 1 to 10 carbon atoms, R′ is alkyl of from 1 to 10 carbon atoms, and R″ is alkyl of from 1 to 10 carbon atoms.

The compounds of the invention are potent oral anti-littering agents at dose levels between 0.25 mg./kg. body weight to 1.0 mg./kg. body weight. At these dose levels, the compounds of the invention do not possess any appreciable progestational or antiovulatory activity.

The 3-oxime esters of the invention are prepared from the oximes of norethindrone esters, the preparations of which are described in my copending application S.N. 502,384 filed Oct. 22, 1965 now abandoned.

The compounds of the invention are prepared by esterifying oximes of different norethindrone esters with an appropriate acid anhydride, such as acetic anhydride, propionoic anhydride, n-valeric anhydride, caprylic anhydride, etc., or by treating different norethindrone esters with a carboxyalkyloxyamine.

The following examples are illustrative of the preparation of the compounds of the invention.

EXAMPLE I

N,17β-diacetoxy-17α-ethynyl-19-norandrost-4-en-3-one oxime

A solution containing 3.0 g. of 17α-ethynyl-17β-acetoxy-19-norandrost-4-en-3-one oxime in 5.0 ml. of pyridine is treated with 9.0 ml. of acetic anhydride and stirred at room temperature for 15 minutes. The mixture is poured into a large amount of ice and water and neutralized with ammonium hydroxide. The solid portion is collected by filtration, dried and recrystallized from hexane to give N,17β - diacetoxy - 17α-ethynyl-19-norandrost-4-en-3-one oxime. M.P. 142–144° C.

$\lambda_{max.}^{EtOH}$ 243 mµ

Calcd. for $C_{24}H_{31}NO_4$: C, 72.51; H, 7.86; N, 3.52.
Found: C, 72,54; H, 8.01; N, 3.73.

EXAMPLE II

N-iso-butyroxy-17β-acetoxy-17α-ethynyl-19-norandrost-4-en-3-one oxime

A solution containing 3.0 g. of 17α-ethynyl-17β-acetoxy-19-norandrost-4-en-3-one oxime in 10 ml. of pyridine is treated with 10 ml. of isobutyric anhydride. The mixture is stirred at room temperature for 15 minutes, and poured into a large amount of ice and water. The semi-solid material is extracted with ethyl acetate and the organic layer is washed with water, dried over sodium sulfate and evaporated. The solid is recrystallized from hexane to give N-isobutyroxy - 17β - acetoxy-17α-ethynyl-19-norandrost-4-en-3-one oxime. M.P. 150–151° C.

$\lambda_{max.}^{EtOH}$ 244 mµ

Calcd. for $C_{26}H_{35}NO_4$: C, 73.38; H, 8.29; N, 3.29.
Found: C, 73.31; H, 8.31; N, 3.53.

EXAMPLE III

N-propionoxy-17β-acetoxy-17α-ethynyl-19-norandrost-4-en-3-one oxime

Following the procedure of Example I or II, but using propionoic anhydride as the esterifying agent, N-propionoxy - 17β - acetoxy-17α-ethynyl-19-norandrost-4-en-3-one oxime is recrystallized from hexane. M.P. 152–154° C.

$\lambda_{max.}^{EtOH}$ 244 mµ

Calcd. for $C_{25}H_{33}NO_4$: C, 72.96; H, 8.08; N, 3.40.
Found: C, 72.69; H, 8.24; N, 3.49.

EXAMPLE IV

N-caproxy-17β-acetoxy-17α-ethynyl-19-norandrost-4-en-3-one oxime

Following the procedure of Example I or II, but using caproic anhydride as the esterifying agent, N-caproxy-17β-acetoxy-17α-ethynyl-19-norandrost-4-en-3-one oxime is recrystallized from hexane. M.P. 102–104° C.

$\lambda_{max.}^{EtOH}$ 243 mµ

Calcd. for $C_{28}H_{39}NO_4$: C, 74.14; H, 8.67; N, 3.09.
Found: C, 74.03; H, 8.55; N, 3.33.

EXAMPLE V 3-(O-carboxymethyl)-17β-acetoxy-17α-ethynyl-19-norandrost-4-en-3-one oxime 17α-ethynyl-17β-acetoxy-19-norandrost-4-en-3-one (2.0 g.) is dissolved in 10 ml. of pyridine and treated with 1.0 g. of carboxymethoxylamine hemi hydrochloride. The mixture is heated on a steam bath for 0.5 hour and poured into a large amount of ice and water. The solid material is collected by filtration and recrystallized from methanol-water to give 3 - (O-carboxymethyl) - 17β-acetoxy-17α-ethynyl - 19 - norandrost - 4 - en-3-one oxime. M.P. 236–237° C.

$\lambda_{max.}^{EtOH}$ 248 mμ

Calcd. for $C_{24}H_{31}NO_5$: C, 69.71; H, 7.56; N, 3.39. Found: C, 69.48; H, 7.60; N, 3.37.

Similarly there may be prepared:

N,17β-dicaproxy-17α-ethynyl-19-norandrost-4-en-3-one oxime,
N-acetoxy-17β-caproxy-17α-ethynyl-19-norandrost-4-en-3-one oxime,
N-propionoxy-17β-caproxy-17α-ethynyl-19-norandrost-4-en-3-one oxime,
N-acetoxy-17β-enanthoxy-17α-ethynyl-19-norandrost-4-en-3-one oxime,
N-propionoxy-17β-enanthoxy-17α-ethynyl-19-norandrost-4-en-3-one oxime,
N,17β-dienanthoxy-17α-ethynyl-19-norandrost-4-en-3-one oxime,
N-acetoxy-17β-decanoxy-17α-ethynyl-19-norandrost-4-en-3-one oxime,
N-propionoxy-17β-decanoxy-17α-ethynyl-19-norandrost-4-en-3-one oxime.

EXAMPLE VI

N,17β-diacetoxy-17α-ethynyl-19-norandrost-4,6-dien-3-one oxime

A solution containing 2.0 g. of 17α-ethynyl-17β-acetoxy-19-norandrost-4,6-dien-3-one oxime in 10 ml. of pyridine is treated wth 15 ml. of acetic anhydride. The mixture is stirred for 15 minutes and poured into a large amount of ice-water. It is neutralized with ammonium hydroxide and the solid portion is collected by filtration. It is dried and recrystallized from ethyl acetate-hexane to give N,17β-diacetoxy - 17α - ethynyl - 19 - norandrost-4,6-dien-3-one oxime. M.P. 218–220° C.

$\lambda_{max.}^{EtOH}$ 283 mμ

Calcd. for $C_{24}H_{29}NO_4$: C, 72.88; H, 7.39; N, 3.54. Found: C, 73.13; H, 7.58; N, 3.79.

EXAMPLE VII

N-propionoxy-17β-acetoxy-17α-ethynyl-19-norandrost-4,6-dien-3-one oxime

Following the procedure of Example VI but using propionic anhydride as the esterifying agent, N-propionoxy - 17β - acetoxy-17α-ethynyl-19-norandrost-4,6-dien-3-one oxime is recrystallized from ethyl acetate-hexane. M.P. 213–214° C.

$\lambda_{max.}^{EtOH}$ 283 mμ

Calcd. for $C_{25}H_{31}NO_4$: C, 73.32; H, 7.63; N, 3.42. Found: C, 73.36; H, 7.77; N, 3.55.

Similarly there may be prepared:

N-caproxy-17β-acetoxy-17α-ethynyl-19-norandrost-4,6-dien-3-one oxime,
N-isobutyroxy-17β-acetoxy-17α-ethynyl-19-norandrost-4,6-dien-3-one oxime,
3-(O-carboxymethyl)-17β-acetoxy-17α-ethynyl-19-norandrost-4,6-dien-3-one oxime,
N,17β-dicaproxy-17α-ethynyl-19-norandrost-4,6-dien-3-one oxime,
N-acetoxy-17β-caproxy-17α-ethynyl-19-norandrost-4,6-dien-3-one oxime,
N-isobutyroxy-17β-caproxy-17α-ethynyl-19-norandrost-4,6-dien-3-one oxime,
N-acetoxy-17β-enanthoxy-17α-ethynyl-19-norandrost-4,6-dien-3-one oxime,
N-isobutyroxy-17β-enanthoxy-17α-ethynyl-19-norandrost-4,6-dien-3-one oxime,
N-acetoxy-17β-decanoxy-17α-ethynyl-19-norandrost-4,6-dien-3-one oxime,
N-propionoxy-17β-decanoxy-17α-ethynyl-19-norandrost-4,6-dien-3-one oxime.

What is claimed is:
1. A compound selected from the group consisting of:

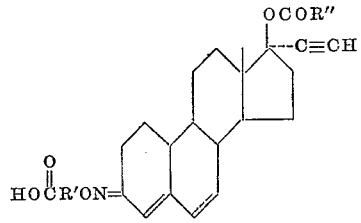

and

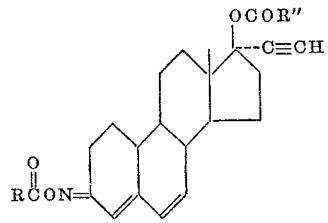

wherein R is selected from the group consisting of alkyl of from 1 to 10 carbon atoms, R' is methylene, and R" is selected from the group consisting of alkyl of from 1 to 10 carbon atoms, and the dotted line indicates an optional double bond in the 6–7 position.

2. 3 - (O-carboxymethyl)-17β-acetoxy-17α-ethynyl-19-norandrost-4-en-3-one oxime according to claim 1.
3. N,17β - diacetoxy - 17α-ethynyl-19-norandrost-4,6-dien-3-one oxime according to claim 1.
4. N-propionoxy - 17β-acetoxy-17α-ethynyl-19-norandrost-4,6-dien-3-one oxime according to claim 1.
5. N-caproxy - 17β-acetoxy-17α-ethynyl-19-norandrost-4,6-dien-3-one oxime according to claim 1.
6. N-iso-butyroxy - 17β-acetoxy-17α-ethynyl-19-norandrost-4,6-dien-3-one oxime according to claim 1.
7. 3 - (O-carboxymethyl)-17β-acetoxy-17α-ethynyl-19-norandrost-4,6-dien-3-one oxime according to claim 1.

References Cited

UNITED STATES PATENTS 3,299,107   1/1967   Mazur _____ 260—397.5

LEWIS GOTTS, *Primary Examiner.*

E. G. LOVE, *Assistant Examiner.*

U.S. Cl. X.R.

260—397.5, 999.